United States Patent
Janson

(10) Patent No.: US 9,108,511 B2
(45) Date of Patent: Aug. 18, 2015

(54) TRANSFER CASE

(71) Applicant: FORD GLOBAL TECHNOLOGIES, LLC, Dearborn, MI (US)

(72) Inventor: David A. Janson, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 330 days.

(21) Appl. No.: 13/859,785

(22) Filed: Apr. 10, 2013

(65) Prior Publication Data

US 2014/0309074 A1    Oct. 16, 2014

(51) Int. Cl.
| | | |
|---|---|---|
| B60K 23/08 | (2006.01) | |
| F16H 48/24 | (2006.01) | |
| F16H 48/10 | (2012.01) | |
| F16H 48/30 | (2012.01) | |
| B60K 17/346 | (2006.01) | |
| B60K 17/342 | (2006.01) | |
| B60K 17/35 | (2006.01) | |

(52) U.S. Cl.
CPC ............ *B60K 23/08* (2013.01); *B60K 17/3462* (2013.01); *F16H 48/10* (2013.01); *F16H 48/24* (2013.01); *F16H 48/30* (2013.01); *B60K 17/342* (2013.01); *B60K 17/35* (2013.01); *B60K 2023/0841* (2013.01)

(58) Field of Classification Search
CPC ......... F16H 48/10; F16H 48/11; F16H 48/24; F16H 48/30; F16H 2048/02; F16H 2048/04; B60K 23/08; B60K 23/0808; B60K 2023/0841; B60K 17/3462; B60K 17/342; B60K 17/344; B60K 17/346; B60K 17/348; B60K 17/35
See application file for complete search history.

(56) References Cited

U.S. PATENT DOCUMENTS

| | | | | |
|---|---|---|---|---|
| 5,819,194 | A | * | 10/1998 | Hara et al. .................... 475/221 |
| 5,833,571 | A | | 11/1998 | Tsukamoto et al. |
| 6,481,304 | B1 | * | 11/2002 | Yoshioka et al. ............... 74/335 |
| 2014/0141923 | A1 | * | 5/2014 | Forsyth .......................... 475/271 |

FOREIGN PATENT DOCUMENTS

| | | |
|---|---|---|
| CN | 102442209 A | 5/2012 |
| JP | 2011112226 A | 6/2011 |
| WO | WO2004008001 A1 | 1/2004 |

* cited by examiner

*Primary Examiner* — Jacob S Scott
(74) *Attorney, Agent, or Firm* — James Dottavio; MacMillan, Sobanski & Todd, LLC

(57) ABSTRACT

A transfer case includes a planetary differential including an input, a first output and a second output, a sprocket journalled on the second output, and a sleeve driveably connected to the second output, for (i) releaseably connecting the first output to the sleeve, (ii) releaseably connecting the sprocket to the sleeve, (iii) releaseably connecting the first output and the sprocket to the sleeve, and (iv) disconnecting the sprocket and first output from the sleeve.

17 Claims, 6 Drawing Sheets

TRANSFER CASE

BACKGROUND OF THE INVENTION

1. Field of the Invention

This invention relates generally to an apparatus for a motor vehicle driveline that selectively produces two-wheel drive, four-wheel drive, all-wheel drive and neutral operation of the driveline.

2. Description of the Prior Art

Some modern automatic transmissions have integral with the transmission itself the ability to shift among two-wheel drive, four-wheel drive, and all-wheel drive ranges. Automatic transmissions also are able to produce a lower speed ratio for use while towing that the speed ratio that is used to launch the vehicle under lower loaded conditions.

A need exists for a transfer case having all-wheel drive capability that can be used in combination with such transmissions.

Preferably the transfer case would not use automatic transmission fluid from the transmission sump or share hydraulic fluid with the transmission.

The transfer case would provide two-wheel drive (2WD) and four-wheel drive 4WD operation with a locked differential and all-wheel drive operation with an open differential.

Preferably the transfer case would not require a controllable hydraulically-actuated clutch, but would produce multiple functional options using a simpler, less costly technique, such as a single displaceable sleeve.

SUMMARY OF THE INVENTION

A transfer case includes a planetary differential including an input, a first output and a second output, a sprocket journalled on the second output, and a sleeve driveably connected to the second output, for (i) releaseably connecting the first output to the sleeve, (ii) releaseably connecting the sprocket to the sleeve, (iii) releaseably connecting the first output and the sprocket to the sleeve, and (iv) disconnecting the sprocket and first output from the sleeve.

The transfer case operates alternately in 2WD, 4WD, AWD and Neutral modes without need for a controllable hydraulically-actuated clutch. All transfer case function options are controlled by a single displaceable sleeve.

The transfer case requires no sharing of hydraulic fluid with the hydraulic system of the transmission.

A vehicle equipped with the transfer case can be towed with all its wheels contacting the ground, i.e., in flat-tow mode, without transmitting wheel rotation to the vehicle's transmission.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
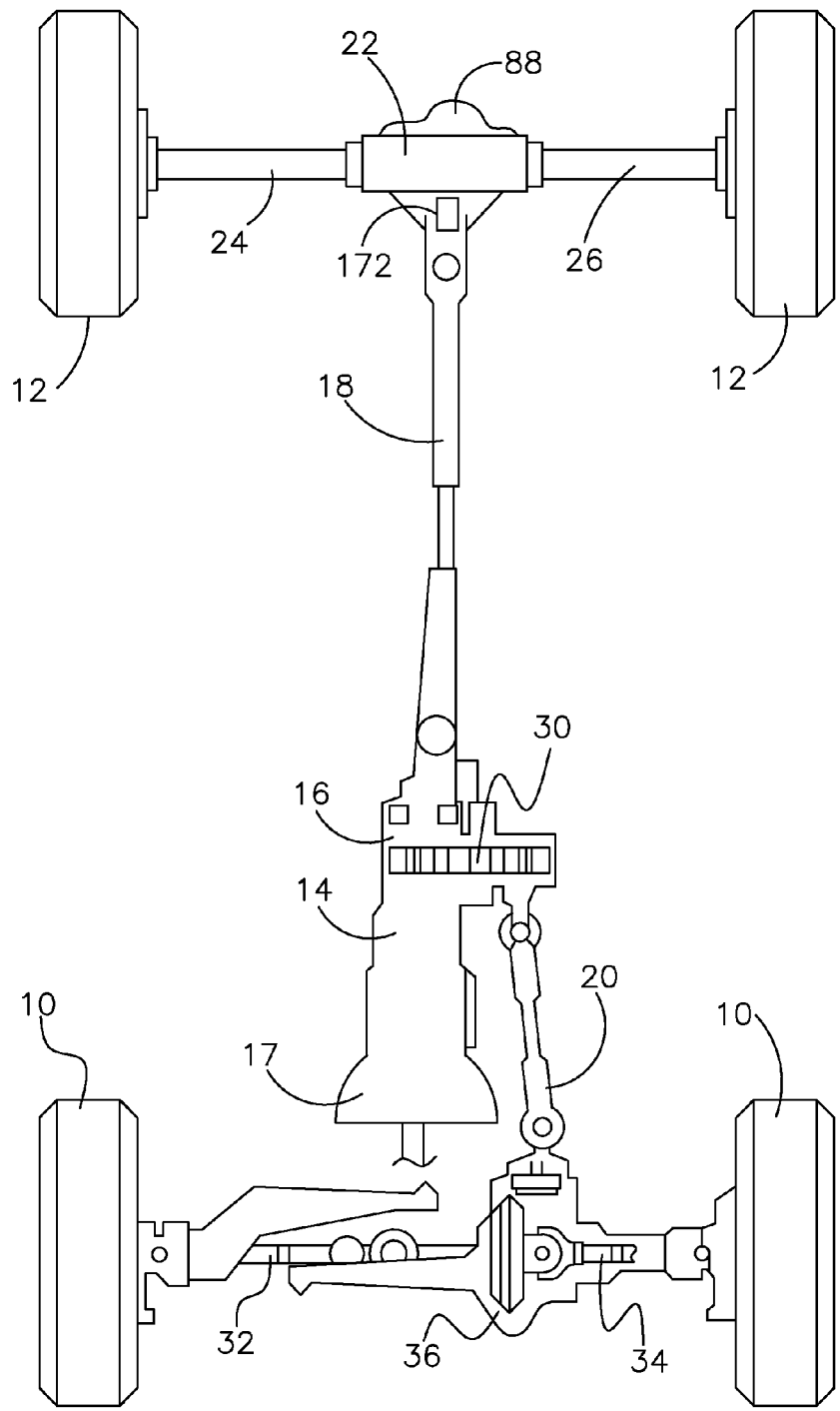
FIG. 1 is a schematic diagram of a motor vehicle powertrain having a transfer case through which torque is transmitted selectively to primary wheels and secondary wheels.
Figure 2:
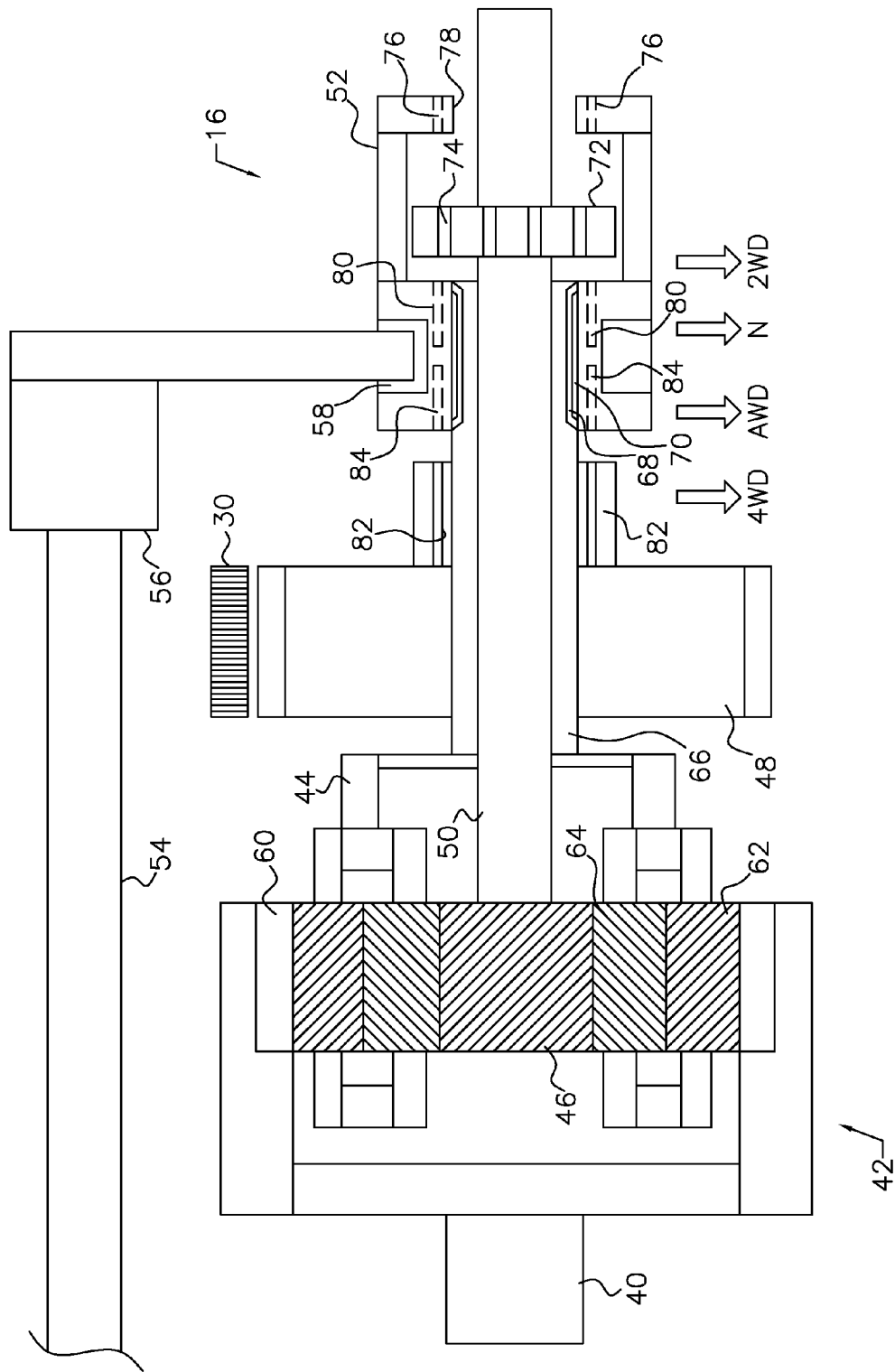
FIG. 2 is a schematic diagram showing a transfer case.

Referring first to FIG. 1, a motor vehicle powertrain includes front and rear wheels 10, 12, a power transmission 14 for producing multiple forward speed ratios and reverse drive, and a transfer case 16. An engine (not shown) transmits power through a torque converter 17 to the input of transmission 14.

When two-wheel-drive (2WD) operation of the powertrain is selected, the transfer case 16 driveably connects the transmission output to a rear drive shaft 18. When four-wheel-drive (4WD) or all-wheel-drive (AWD) operation is selected, the transfer case 16 directly connects the transmission output concurrently to the front drive shaft 20 and to rear drive shaft 18 through a chain drive 30.

Shaft 18 transmits power to a rear wheel differential mechanism 22, from which power is transmitted differentially to the rear wheels 12 through axle shafts 24, 26, which are contained within a differential housing. The front wheels 10 are driveably connected to right-hand and left-hand half shafts 32, 34, to which power is transmitted from the front drive shaft 20 through a front differential 36.

The components of transfer case 16 include an input 40, which is driveably connected to the output of transmission 14; a planetary differential 42, which split input torque in two equal portions carried by a planet carrier 44 and by sun gear 46; a sprocket 48, which is engaged by a drive chain 30; a first output 50 of planetary differential 42 secured to sun gear 46 and continually driveably connected to rear driveshaft 18; a sleeve 52; a rail 54; and a fork 56, which is secured to rail 54 for axial displacement with the rail and engages a recess 58 on sleeve 52, thereby allowing the sleeve to rotate relative to the fork and rail.

Differential 42 further includes a ring gear 60, secured to input 40; first planet pinions 62 meshing with ring gear 60 and supported on carrier 44; second planet pinion supported on carrier 44 and meshing with pinions 62 and ring gear 46. The differential 42 has a second output represented by carrier 44 and a sleeve shaft 66, which is secured to carrier 44.

Sleeve shaft 66 is formed with external axial spline teeth 68, which are in continuous meshing engagement with internal, axial spline teeth 70 formed on sleeve 52.

Sprocket 48 is journalled on the sleeve shaft 66 portion of the differential's second output.

Output 50 includes external, axial spline teeth 74 formed on the outer cylindrical surface of disc 72. Due to axial displacement of sleeve 52, spline teeth 74 mesh with and disengage from internal, axial spline teeth 76, formed on an internal cylindrical surface of an annular member 78, secured to an axial end of sleeve 52. Due to axial displacement of sleeve 52, spline teeth 74 also mesh with and disengage from internal, axial spline teeth 80, formed on an internal cylindrical surface of sleeve 52.

Sprocket 48 is formed with external, axial spline teeth 82. Due to axial displacement of sleeve 52, spline teeth 82 can mesh with and disengage from internal, axial spline teeth 84, formed on an internal cylindrical surface of sleeve 52.

Figure 3:
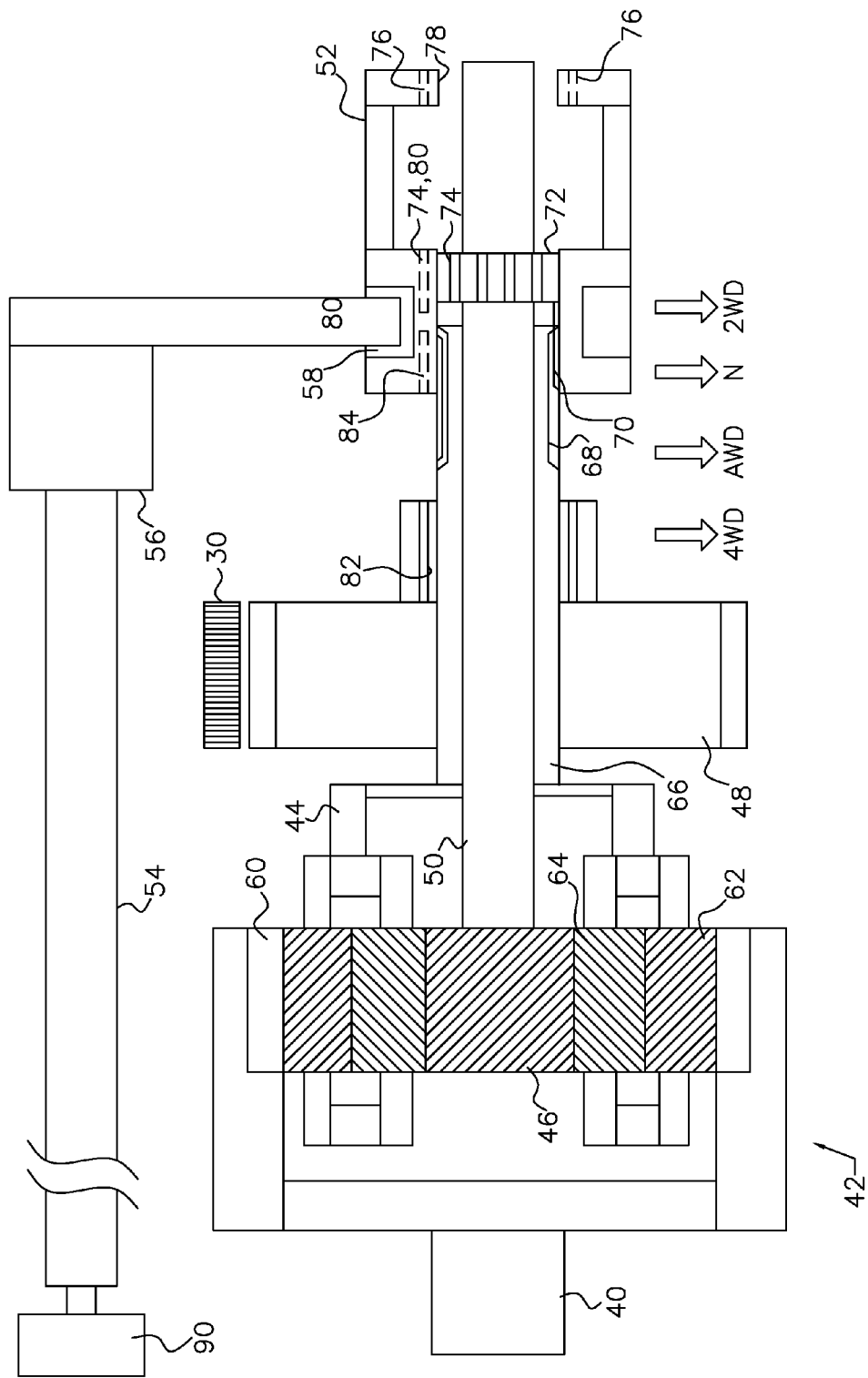
FIG. 3 is a schematic diagram showing the transfer case sleeve in its 2WD position, wherein the primary wheels are driven through a locked differential.

Transfer case 16 operates in 2WD mode in response to movement of fork 56 to the position shown in FIG. 3. Spline teeth 74 on disc 72 of the output 50 mesh with spline teeth 80 of sleeve 52. Spline teeth 68 of sleeve shaft 66 mesh with spline teeth 70 of sleeve 52. Differential 42 is then locked due to the sun gear 46 and carrier 44 being mutually connected at sleeve 52. But because sprocket 48 is not engaged with sleeve 52, torque is not transmitted by drive chain 30 to the front drive shaft 20. Therefore, output 50 transmits all of the torque at input 40 through locked differential 42, rear driveshaft 18, rear differential 22 and shafts 24, 26 to the rear wheels 12, which are the primary wheels.

Figure 4:
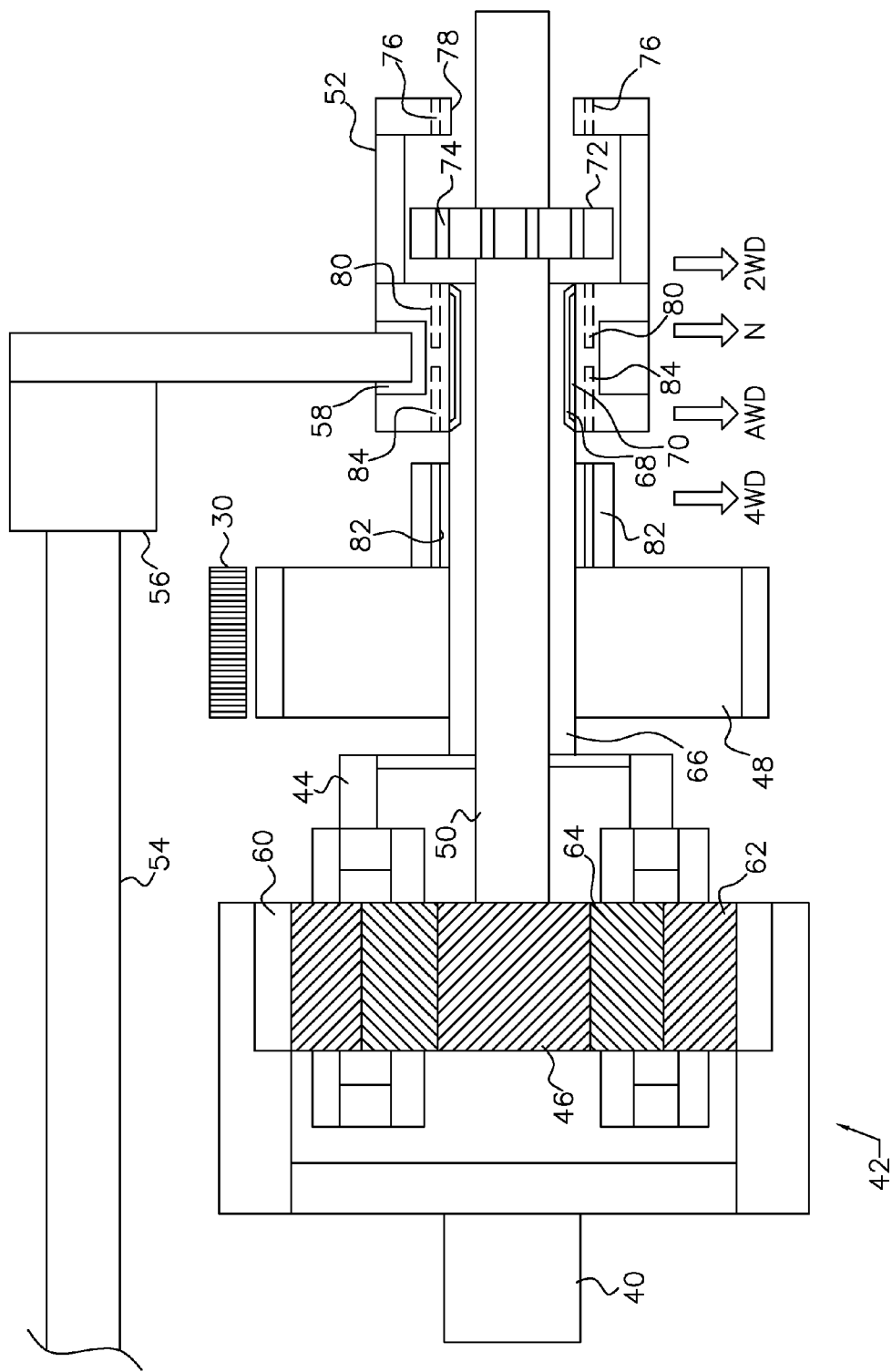
FIG. 4 is a schematic diagram showing the transfer case sleeve in its neutral position.

Transfer case 16 operates in neutral mode when fork 56 is moved to the position shown in FIG. 4. Because sprocket 48 is not engaged with sleeve 52, no torsional reaction is applied by the front wheels 10, through sprocket 48, to carrier 44. Differential 42, therefore, is open due to sun gear 46 and carrier 44 being mutually disconnected at sleeve 52, due to spline teeth 74 on disc 72 of the output 50 being disengaged from spline teeth 80 of sleeve 52.

Figure 5:
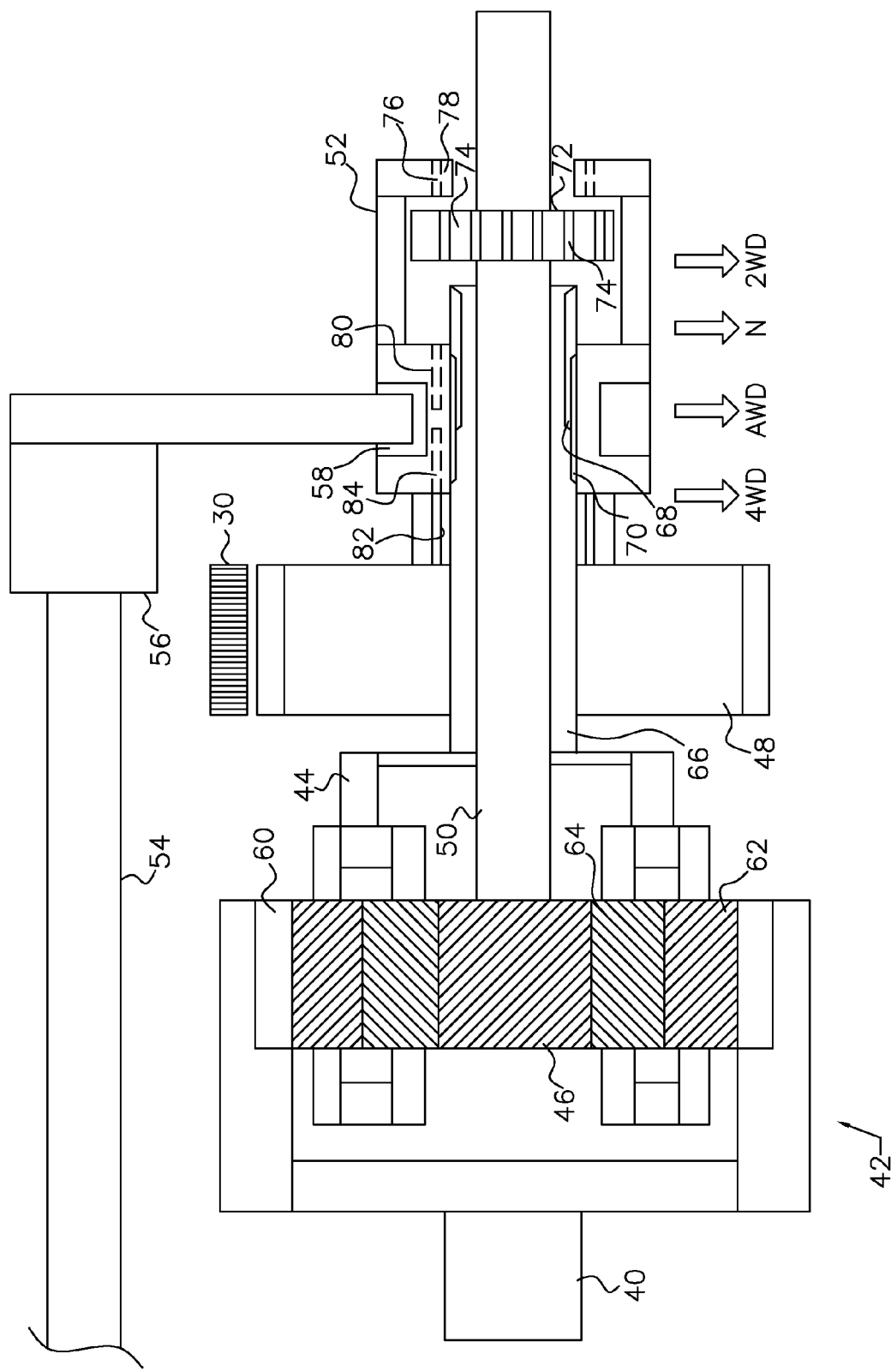
FIG. 5 is a schematic diagram showing the transfer case sleeve in its AWD position, wherein primary and secondary wheels are driven through an open differential.

Transfer case 16 operates in AWD mode when fork 56 is moved to the position shown in FIG. 5. Spline teeth 82 on sprocket 48 mesh with spline teeth 84 of sleeve 52. Spline teeth 68 of sleeve shaft 66 mesh with spline teeth 70 of sleeve 52. Differential 42 is then open and transmits approximately one-half of the torque at input 40 (the secondary wheels) through carrier 44, sleeve shaft 66, into sleeve 52 through meshing spline teeth 68, 70, out of sleeve 52 to sprocket 48 through meshing spline teeth 82, 84, in drive chain 30 and front axle shaft 20 to the front wheels 10. Similarly, differential 42 transmits approximately one-half of the torque at input 40 to the rear wheels 10 through output 50, and sun gear 46.

Figure 6:
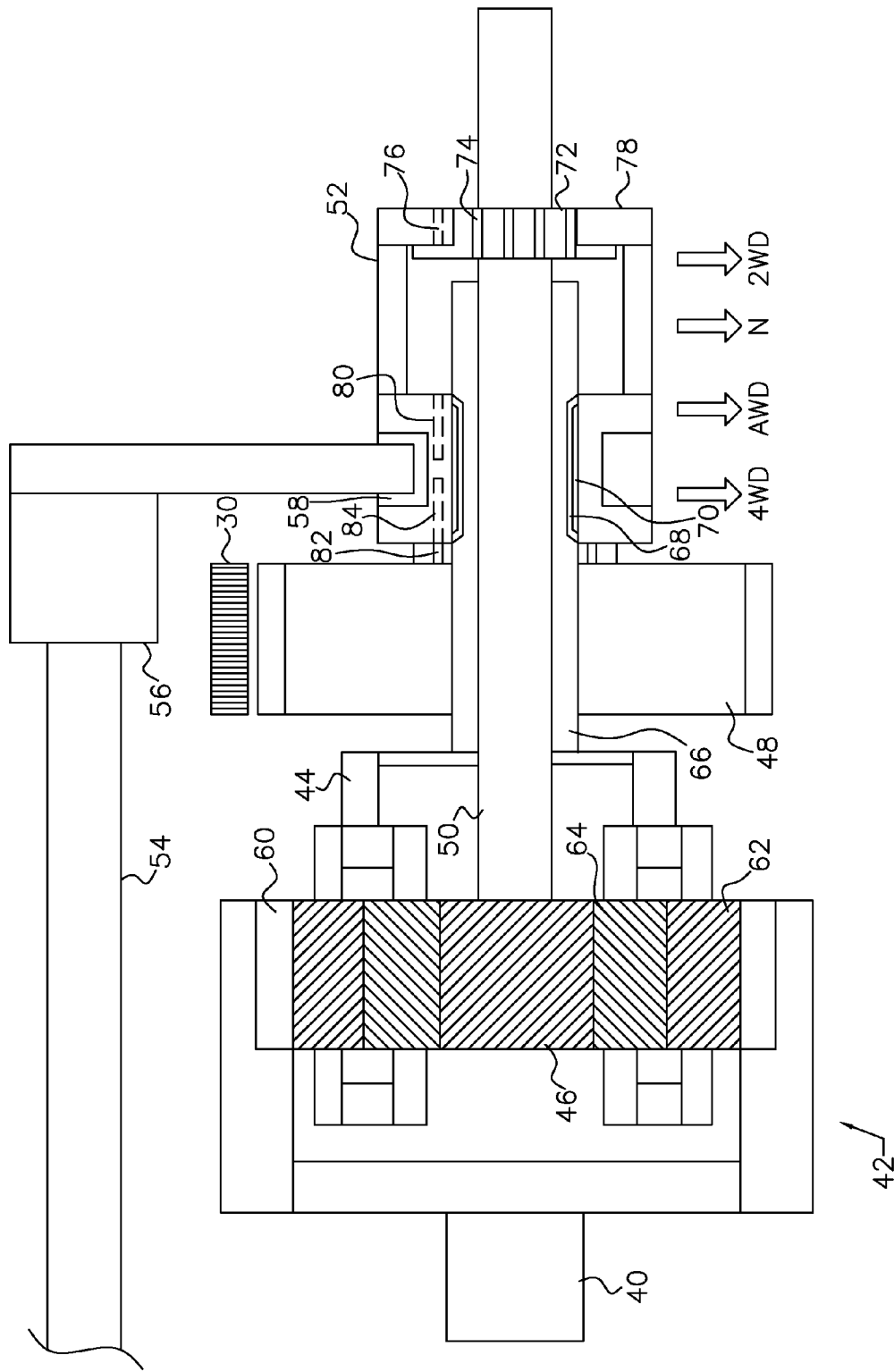
FIG. 6 is a schematic diagram showing the transfer case sleeve in its 4WD position, wherein primary and secondary wheels are driven through a locked differential.

Transfer case 16 operates in 4WD mode when fork 56 is moved to the position shown in FIG. 6. Spline teeth 74 on disc 72 of the output 50 mesh with spline teeth 76 of sleeve 52. Spline teeth 68 of sleeve shaft 66 mesh with spline teeth 70 of sleeve 52. Differential 42 is then locked due to sun gear 46 and carrier 44 being mutually connected at sleeve 52. The front wheels 10 are driveably connected through front drive shaft 20, drive chain 30, sprocket 48, and meshing spline teeth 82, 84, to sleeve 52. Similarly, the rear wheels 12 are driveably connected through rear drive shaft 18, and meshing spline teeth 74, 76 to sleeve 52. Input 40 is connected thought locked differential 42 and meshing spline teeth 68, 70 to sleeve 52.

A hydraulic or electric actuator 90, preferably located in transmission 14, is used displace the rail 54, fork 56 and sleeve 52 among the axial positions that correspond to the selected operating mode of transfer case 16.

In accordance with the provisions of the patent statutes, the preferred embodiment has been described. However, it should be noted that the alternate embodiments can be practiced otherwise than as specifically illustrated and described.

The invention claimed is:

1. A transfer case, comprising:
a planetary differential including an input, a first output and a second output;
a sprocket journalled on the second output;
a sleeve driveably connected to the second output, producing (i) a first mode by releaseably connecting the first output to the sleeve, (ii) a second mode by releaseably connecting the sprocket to the sleeve, and (iii) a third mode by releaseably connecting the first output and the sprocket to the sleeve.

2. The transfer case of claim 1, wherein the sleeve is displaceable among positions, each position corresponding to one of the first mode, the second mode and the third mode.

3. The transfer case of claim 2, further comprising:
a rail;
a fork secured to the rail and engaged with the sleeve;
an actuator for displacing the rail along an axis among the positions.

4. The transfer case of claim 1, wherein:
the first mode corresponds to two-wheel-drive operation, wherein the differential is locked;
the second mode corresponds to all-wheel-drive operation, wherein the differential is open; and
the third mode corresponds to four-wheel-drive operation, wherein the differential is locked.

5. The transfer case of claim 1, wherein:
the first output is continually driveably connected to a first wheel set; and
the sprocket is driveably connectable to a second wheel set.

6. The transfer case of claim 5, further comprising:
a drive chain engaged with the sprocket for transmitting torque between the second wheel set and the sprocket.

7. The transfer case of claim 1, wherein the sleeve produces a fourth mode, wherein the sprocket and first output are driveably disconnected from the sleeve and the differential is open.

8. The transfer case of claim 1, wherein:
the input is secured to a ring gear;
the first output is secured to a sun gear;
the second output is secured to a planet carrier; and
the planetary differential further includes first planet pinions meshing with the ring gear and supported on the carrier, and second planet pinions meshing with the first planet pinions and with the sun gear and supported on the carrier.

9. The transfer case of claim 1, wherein:
the sleeve includes first and second spaced sets of spline teeth;
the first output includes a third set of spline teeth releaseably engageable alternately with the first and second sets of spline teeth on the sleeve; and
the sprocket includes a fourth set of spline teeth releaseably engageable with a fifth set of spline teeth on the sleeve.

10. A transfer case, comprising:
a planetary differential including an input, a first output and a second output;
a sprocket journalled on the second output;
a sleeve driveably connected to the second output, for (i) releaseably connecting the first output to the sleeve, (ii) releaseably connecting the sprocket to the sleeve, (iii) releaseably connecting the first output and the sprocket to the sleeve, and (iv) disconnecting the sprocket and first output from the sleeve.

11. A transfer case, comprising:
a planetary differential including an input, a first output and a second output;
a sprocket journalled on the second output;
a sleeve driveably connected to the second output, displaceable among discrete positions wherein (i) the first output is releaseably connected to the sleeve, (ii) the sprocket is releaseably connected to the sleeve, and (iii) the first output and the sprocket are releaseably connected to the sleeve.

12. The transfer case of claim 11, wherein the sleeve is displaceable to a further position wherein the sprocket and first output are disconnected from the sleeve.

13. The transfer case of claim 11, further comprising:
a rail;
a fork secured to the rail and engaged with the sleeve;
an actuator for displacing the rail along an axis among the positions.

14. The transfer case of claim 11, wherein:
the first output is continually driveably connected to a first wheel set; and
the sprocket is driveably connectable to a second wheel set.

15. The transfer case of claim 14, further comprising:
a drive chain engaged with the sprocket for transmitting torque between the second wheel set and the sprocket.

16. The transfer case of claim 11, wherein:
the input is secured to a ring gear;
the first output is secured to a sun gear;
the second output is secured to a planet carrier; and
the planetary differential further includes first planet pinions meshing with the ring gear and supported on the carrier, and second planet pinions meshing with the first planet pinions and with the sun gear and supported on the carrier.

17. The transfer case of claim 11, wherein:
the sleeve includes first and second spaced sets of spline teeth;
the first output includes a third set of spline teeth releaseably engageable alternately with the first and second sets of spline teeth on the sleeve; and
the sprocket includes a fourth set of spline teeth releaseably engageable with a fifth set of spline teeth on the sleeve.

\* \* \* \* \*